US010129453B2

(12) United States Patent
Iwasaki

(10) Patent No.: US 10,129,453 B2
(45) Date of Patent: *Nov. 13, 2018

(54) IMAGE CAPTURING APPARATUS, IMAGE CAPTURING SYSTEM, CONTROL METHOD OF IMAGE CAPTURING APPARATUS, AND COMPUTER READABLE STORAGE MEDIUM

(71) Applicant: CANON KABUSHIKI KAISHA, Tokyo (JP)

(72) Inventor: Takahiro Iwasaki, Port Washington, NY (US)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/876,005

(22) Filed: Jan. 19, 2018

(65) Prior Publication Data

US 2018/0146128 A1 May 24, 2018

Related U.S. Application Data

(63) Continuation of application No. 15/432,759, filed on Feb. 14, 2017, now Pat. No. 9,912,855, which is a
(Continued)

(30) Foreign Application Priority Data

Nov. 22, 2012 (JP) .................................. 2012-256772

(51) Int. Cl.
*H04N 5/232* (2006.01)
*H04N 5/77* (2006.01)
(Continued)

(52) U.S. Cl.
CPC ......... *H04N 5/23206* (2013.01); *H04N 5/772* (2013.01); *H04N 7/18* (2013.01); *H04N 9/8042* (2013.01)

(58) Field of Classification Search
CPC ...... H04N 5/23206; H04N 5/772; H04N 7/18; H04N 9/8042
See application file for complete search history.

(56) References Cited

U.S. PATENT DOCUMENTS

2002/0097322 A1* 7/2002 Monroe ............ H04N 5/23206 348/159
2006/0253552 A1* 11/2006 Ohi .................... H04N 5/23206 709/219
(Continued)

FOREIGN PATENT DOCUMENTS

| JP | 10-164555 A | 6/1998 |
|----|-------------|--------|
| JP | 2005-323007 A | 11/2005 |

(Continued)

OTHER PUBLICATIONS

ONVIF Core Specification (http://www.onvif.org/specs/DocMap.html);Version 2.2; May 2012; 144 pages.

*Primary Examiner* — Nhan T Tran
(74) *Attorney, Agent, or Firm* — Canon U.S.A., Inc. IP Division

(57) ABSTRACT

An image capturing apparatus includes: an encoding unit configured to perform encoding processing on an image output from an image capturing unit for obtaining an image; a communication unit configured to receive designation of a resolution of the encoding unit from an information processing apparatus; an obtaining unit configured to obtain a resolution which is associated with the resolution set for the image capturing unit, and is settable for the encoding unit; a determination unit configured to determine whether the designated resolution is the resolution obtained by the obtaining unit and settable for the encoding unit; and a transmission unit configured to transmit an error response to the information processing apparatus, if the determination unit determines that the designated resolution is not the
(Continued)

| | | | | | Video Encoder Configuration | | |
|---|---|---|---|---|---|---|---|
| | 4000 | 4001 | 4002 | 4003 | 4004 | 4005 | 4006 |
| | Video Source | | | | | | |
| VideoSourceMode | Resolution | Framerate | Encoding | RESOLUTION CHOICE | Resolution | FramerateLimit |
| S1 | 3840×2160 | 20fps MATCH | H.264 | E1 | 3840×2160 | 20fps |
| | | | | E2 | 1920×1080 | |
| | | | | E3 | 1280×720 | |
| | | | | E4 | 960×540 | |
| S2 | 3200×2400 | 30fps MATCH | H.264 | E1 | 3200×2400 | 30fps |
| | | | | E2 | 2048×1536 | |
| | | | | E3 | 1280×960 | |
| | | | | E4 | 1024×768 | |
| S3 | 800×600 | 30fps MATCH | H.264 or MotionJPEG | E1 | 800×600 | 30fps |
| | | | | E2 | 640×480 | |
| | | | | E3 | 320×240 | |
| | | | | E4 | 176×144 | | resolution obtained by the obtaining unit and settable for the encoding unit.

38 Claims, 13 Drawing Sheets

Related U.S. Application Data continuation of application No. 14/646,330, filed as application No. PCT/JP2013/081331 on Nov. 14, 2013, now Pat. No. 9,609,198.

(51) Int. Cl.
*H04N 9/804* (2006.01)
*H04N 7/18* (2006.01)

(56) References Cited

U.S. PATENT DOCUMENTS

2011/0164679 A1* 7/2011 Satou .................. H04N 19/172
375/240.03
2015/0334285 A1* 11/2015 Zhang ................ H04N 5/23206
348/211.2

FOREIGN PATENT DOCUMENTS

| JP | 2009-206931 A | 9/2009 |
| JP | 2012-227602 A | 11/2012 |

* cited by examiner

FIG. 4

| | Video Source | | Framerate | Encoding | Video Encoder Configuration | | | |
|---|---|---|---|---|---|---|---|---|
| 4000 | 4001 | | 4002 | 4003 | 4004 | | 4005 | 4006 |
| VideoSourceMode | Resolution | | Framerate | Encoding | RESOLUTION CHOICE | Resolution | FramerateLimit | |
| S1 | 3840×2160 | | 20fps ⇕ MATCH | H.264 | E1 | 3840×2160 | 20fps | |
| | | | | | E2 | 1920×1080 | | |
| | | | | | E3 | 1280×720 | | |
| | | | | | E4 | 960×540 | | |
| S2 | 3200×2400 | | 30fps ⇕ MATCH | H.264 | E1 | 3200×2400 | 30fps | |
| | | | | | E2 | 2048×1536 | | |
| | | | | | E3 | 1280×960 | | |
| | | | | | E4 | 1024×768 | | |
| S3 | 800×600 | | 30fps ⇕ MATCH | H.264 or MotionJPEG | E1 | 800×600 | 30fps | |
| | | | | | E2 | 640×480 | | |
| | | | | | E3 | 320×240 | | |
| | | | | | E4 | 176×144 | | |

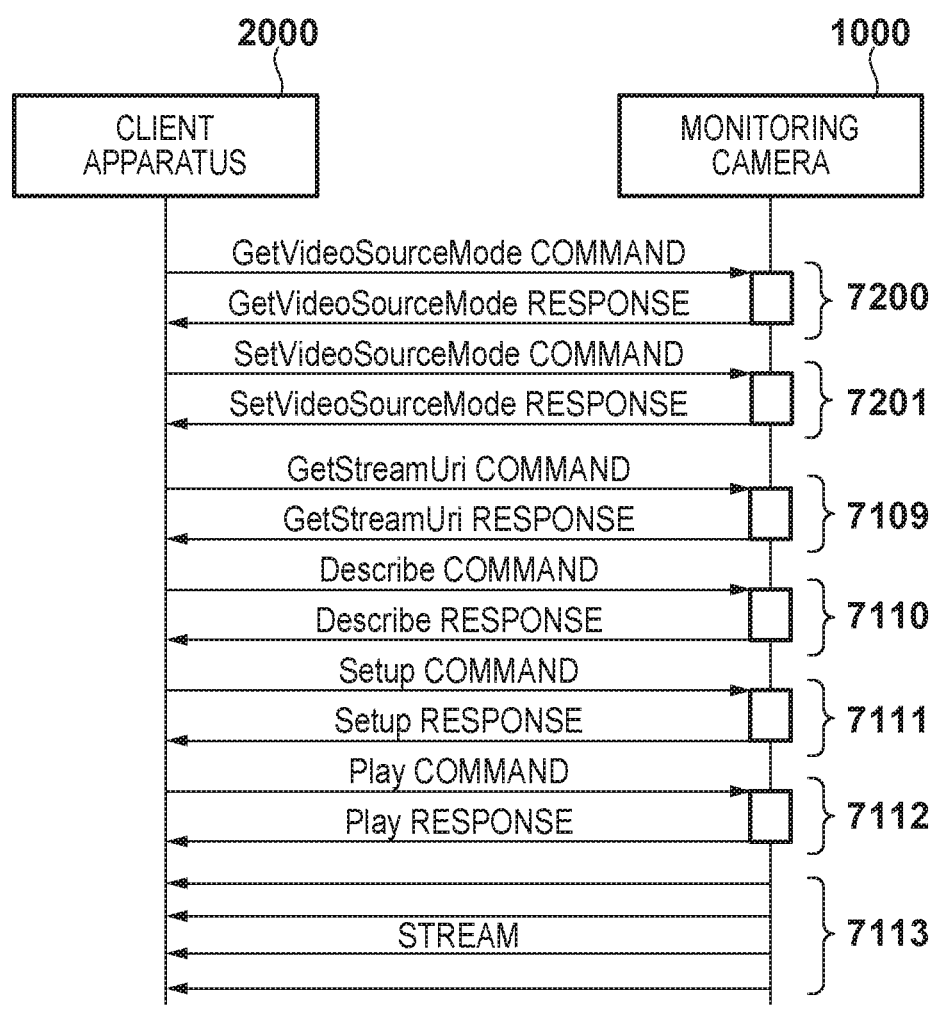

IMAGE CAPTURING APPARATUS, IMAGE CAPTURING SYSTEM, CONTROL METHOD OF IMAGE CAPTURING APPARATUS, AND COMPUTER READABLE STORAGE MEDIUM

CROSS-REFERENCE TO RELATED APPLICATIONS

This application is a Continuation of U.S. application Ser. No. 15/432,759, filed Feb. 14, 2017, now U.S. Pat. No. 9,912,855 B2, which is a Continuation of U.S. application Ser. No. 14/646,330, filed May 20, 2015, now U.S. Pat. No. 9,609,198 B2, which is a National Stage filing of International Application No. PCT/JP2013/081331 filed Nov. 14, 2013, which claims the benefit of priority from Japanese Patent Application No. 2012-256772 filed Nov. 22, 2012, the disclosures of each of which are hereby incorporated by reference herein in their entirety.

BACKGROUND

Technical Field

The present invention relates to an image capturing apparatus, an image capturing system, a control method of the image capturing apparatus, and a computer readable storage medium.

Background Art

Conventionally, an image capturing apparatus for transmitting a captured image to a receiving apparatus includes commands for allowing an external apparatus to change the settings of the image capturing apparatus and designate the start of image distribution. Known examples of these commands are those defined by standards formulated by the ONVIF (Open Network Video Interface Forum).

In the ONVIF specifications (http://www.onvif.org/specs/DocMap.html), commands formulated by the ONVIF are described.

The above-described commands include, for example, a command for changing, from an external apparatus, the resolution of image data to be generated by an image capturing unit of the image capturing apparatus. The above-described commands also include a command for changing the resolution of a distribution image to be distributed to an external apparatus when the distribution image is generated by encoding image data generated by the image capturing unit. For example, in the ONVIF standards, a SetVideoSourceMode command is defined as the former command, and a SetVideoEncoderConfiguration command is defined as the latter command.

Furthermore, in addition to the ONVIF standards, Japanese Patent Laid-Open No. 2005-323007 has disclosed an image capturing apparatus including a control unit for controlling the expansion and compression of a captured image.

Unfortunately, there is a problem that if only one of the resolution of image data to be generated by the image capturing unit and the resolution of a distribution image to be generated by a compression encoding unit is changed, mismatching occurs in a combination of the two resolutions and this makes the generation of the distribution image impossible in some cases. Also, in a case like this, it is necessary to transmit a command for correctly changing the other resolution from an external apparatus to the image capturing apparatus, in order to cancel the mismatching and correctly generate the distribution image. This complicates the user's operation.

Assume that the output resolution of the image capturing unit is 1,600×1,200 pixels (UXGA), and the output resolution of the compression encoding unit is 1,280×1,024 pixels (SXGA). In this case, if the output resolution of the image capturing unit is changed to 1,024×768 (XGA), the compression encoding unit in which a higher output resolution is set may become unable to generate any distribution image. Assume also that the output resolution of the image capturing unit is 1,600×1,200 pixels (resolution aspect ratio=4:3), and the output resolution of the compression encoding unit is 1,280×1,024 pixels (resolution aspect ratio=4:3). In this case, if the output resolution of the image capturing unit is changed to 1,920×1,080 (full HD, resolution aspect ratio=16:9), the compression encoding unit in which a different resolution aspect ratio is set may become unable to generate any distribution image.

If this is the case, before obtaining a video stream from the image capturing unit, the user must change the output resolution of the compression encoding unit to a resolution, such as 1,024×768 (XGA) or 1,920×1,080 (resolution aspect ratio=16:9), which matches the output resolution of the image capturing unit, and this complicates the operation.

SUMMARY OF INVENTION

The present invention provides an image capturing technique that prevents the occurrence of mismatching in a combination of the resolution of image data to be generated by an image capturing unit and the resolution of a distribution image to be generated by a compression encoding unit, even when only one resolution is changed.

According to one aspect of the present invention, there is provided an image capturing apparatus comprising: an encoding unit configured to perform encoding processing on an image output from an image capturing unit for obtaining an image; a communication unit configured to receive designation of a resolution of the encoding unit from an information processing apparatus; an obtaining unit configured to obtain a resolution which is associated with the resolution set for the image capturing unit, and is settable for the encoding unit; a determination unit configured to determine whether the designated resolution is the resolution obtained by the obtaining unit and settable for the encoding unit; and a transmission unit configured to transmit an error response to the information processing apparatus via the communication unit, if the determination unit determines that the designated resolution is not the resolution obtained by the obtaining unit and settable for the encoding unit.

According to another aspect of the present invention, there is provided a control method of an image capturing apparatus including an encoding unit configured to perform encoding processing on an image output from an image capturing unit for obtaining an image, comprising: a first communication step of receiving designation of a resolution of the encoding unit from an information processing apparatus; an obtaining step of obtaining a resolution which is associated with the resolution set for the image capturing unit, and is settable for the encoding unit; a determination step of determining whether the designated resolution is the resolution obtained in the obtaining step and settable for the encoding unit; and a transmission step of transmitting an error response to the information processing apparatus, if it is determined in the determination step that the designated resolution is not the resolution obtained in the obtaining step and settable for the encoding unit.

According to still another aspect of the present invention, there is provided a computer readable storage medium containing computer-executable instructions that control an image capturing apparatus including an encoding unit configured to perform encoding processing on an image output from an image capturing unit for obtaining an image, the medium comprising: computer-executable instructions that receive designation of a resolution of the encoding unit from an information processing apparatus; computer-executable instructions that obtain a resolution which is associated with the resolution set for the image capturing unit, and is settable for the encoding unit; computer-executable instructions that determine whether the designated resolution is the obtained resolution settable for the encoding unit; and computer-executable instructions that transmit an error response to the information processing apparatus, if it is determined that the designated resolution is not the obtained resolution settable for the encoding unit.

According to yet another aspect of the present invention, there is provided an image capturing system comprising an image capturing apparatus including an encoding unit configured to encode an image output from an image capturing unit for obtaining an image, and an information processing apparatus connected to the image capturing apparatus across a network, wherein the information processing apparatus comprises a generation unit configured to generate designation of a resolution of the encoding unit, and the image capturing apparatus comprises: a communication unit configured to receive the designation of the resolution of the encoding unit from the information processing apparatus; an obtaining unit configured to obtain a resolution which is associated with the resolution set for the image capturing unit, and is settable for the encoding unit; a determination unit configured to determine whether the designated resolution is the resolution obtained by the obtaining unit and settable for the encoding unit; and a transmission unit configured to transmit an error response to the information processing apparatus via the communication unit, if the determination unit determines that the designated resolution is not the resolution obtained by the obtaining unit and settable for the encoding unit.

Further features of the present invention will become apparent from the following description of exemplary embodiments (with reference to the attached drawings).

BRIEF DESCRIPTION OF DRAWINGS

FIG. 4 is a view showing an example of a table storing information for matching the settings of an image capturing unit of the image capturing apparatus with the settings of a compression encoding unit;

FIG. 5B is a view showing an example of a command sequence when changing the output resolution of the image capturing unit of the image capturing apparatus;

DESCRIPTION OF EMBODIMENTS

Exemplary embodiments of the present invention will be explained in detail below with reference to the accompanying drawings. However, constituent elements described in these embodiments are merely examples, and the technical scope of the present invention is determined by the scope of the appended claims, and is not limited by the following individual embodiments.

First Embodiment

Figure 1A:
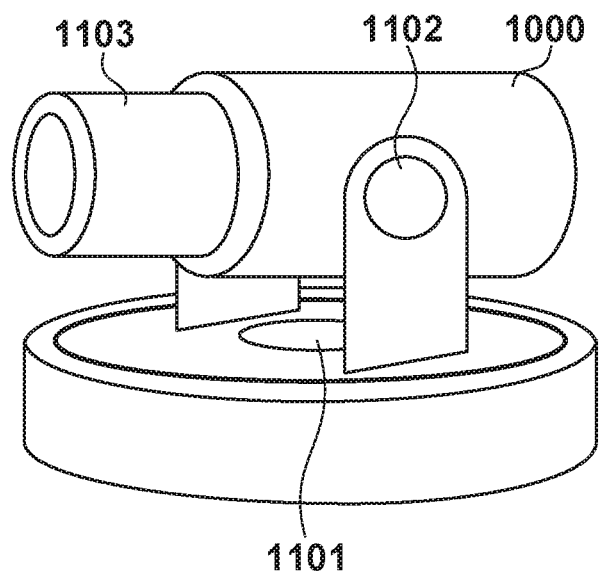
FIGS. 1A and 1B are views showing examples of the arrangements of an image capturing apparatus and image capturing system.

FIG. 1A is a view showing an example of a monitoring camera 1000 as an image capturing apparatus according to the embodiment of the present invention. A mechanism 1101 is a mechanism for changing the direction of a lens in a panning direction, a mechanism 1102 is a mechanism for changing the lens direction in a tilting direction, and a mechanism 1103 is a mechanism for changing zooming.

Figure 1B:
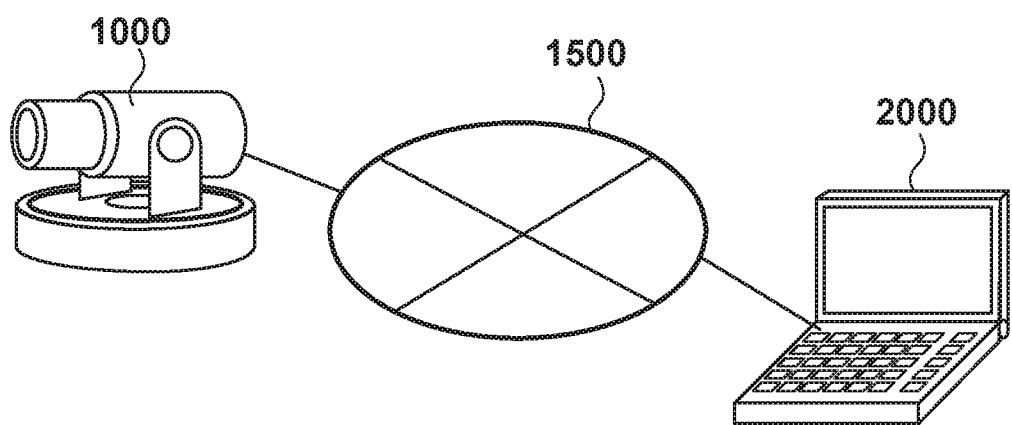

FIG. 1B is a view showing an example of the configuration of an image capturing system including the monitoring camera 1000. A client apparatus 2000 (an information processing apparatus) as an external apparatus is connected to the monitoring camera 1000 across a network 1500 so as to be able to communicate with the monitoring camera 1000. The client apparatus 2000 transmits various commands such as a command for changing image capturing parameters (to be described later), a command for driving a platform, and a command for starting video streaming to the monitoring camera 1000. The monitoring camera 1000 transmits responses to these commands and video streaming to the client apparatus 2000.

Figure 2:
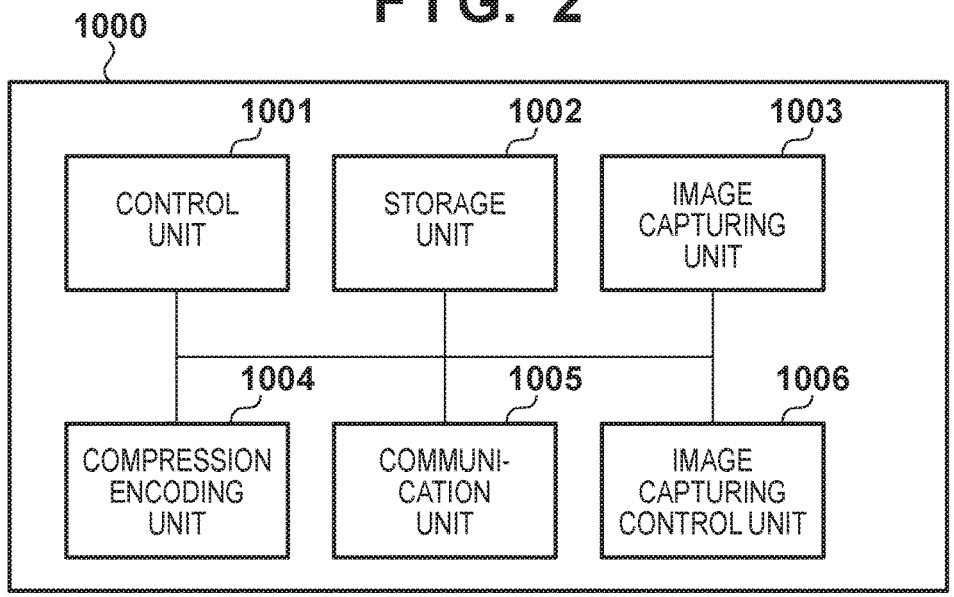
FIG. 2 is a view showing an example of the internal arrangement of the image capturing apparatus.

FIG. 2 is a view showing an example of the internal arrangement of the monitoring camera 1000 (the image capturing apparatus). Referring to FIG. 2, a control unit 1001 is a CPU or the like, and controls the whole monitoring camera 1000. A storage unit 1002 is used as various data storage areas such as a storage area for programs to be mainly executed by the control unit 1001, a work area to be used while the programs are executed, and a storage area for image data generated by an image capturing unit 1003 (to be described below).

The image capturing unit 1003 converts an analog signal obtained by capturing an object image into digital data, and outputs the data as a captured image (image data) to the storage unit 1002. The resolution and frame rate of the image data output from the image capturing unit 1003 can be changed by a SetVideoSourceMode command (to be described later).

A compression encoding unit 1004 generates image data by performing compression encoding processing on the captured image output from the image capturing 1003 based on a format such as Motion JPEG or H.264, and outputs the generated image data to the storage unit 1002. The types of the resolution (distribution resolution) of the image data output from the compression encoding unit 1004 have a dependency relationship as shown in FIG. 4 (to be described later) with each mode of the image capturing unit 1003.

A communication unit 1005 receives each control command from the external apparatus (client apparatus 2000). Also, the communication unit 1005 transmits a response to each control command to the external apparatus (client apparatus 2000). Furthermore, the communication unit 1005 receives first designation for setting the resolution of the image capturing unit 1003, or second designation for setting the resolution of the compression encoding unit 1004. When the setting of one resolution is to be changed to a different resolution setting by the first or second designation, the control unit 1001 changes the setting of the other resolution to a resolution matching the setting of one resolution. This resolution changing process will be explained in detail later with reference to FIGS. 6A, 6C, and 6E.

An image capturing control unit 1006 controls the tilting mechanism 1101, panning mechanism 1102, and zooming mechanism 1103 in response to the values of a panning angle, tilting angle, and zooming magnification input from the control unit 1001. Also, the image capturing control unit 1006 provides the current panning angle value, tilting angle value, and zooming magnification value of the monitoring camera 1000, in accordance with an inquiry from the control unit 1001. The internal arrangement of the monitoring camera 1000 has been explained above with reference to FIG. 2. However, the processing blocks shown in FIG. 2 are exemplary blocks, so the arrangement of the image capturing apparatus according to the embodiment of the present invention is not limited to the processing blocks shown in FIG. 2. For example, it is also possible to use a voice input unit in addition to the processing blocks shown in FIG. 2, or exclude the image capturing control unit therefrom, that is, various modifications and changes can be made.

Figure 3:
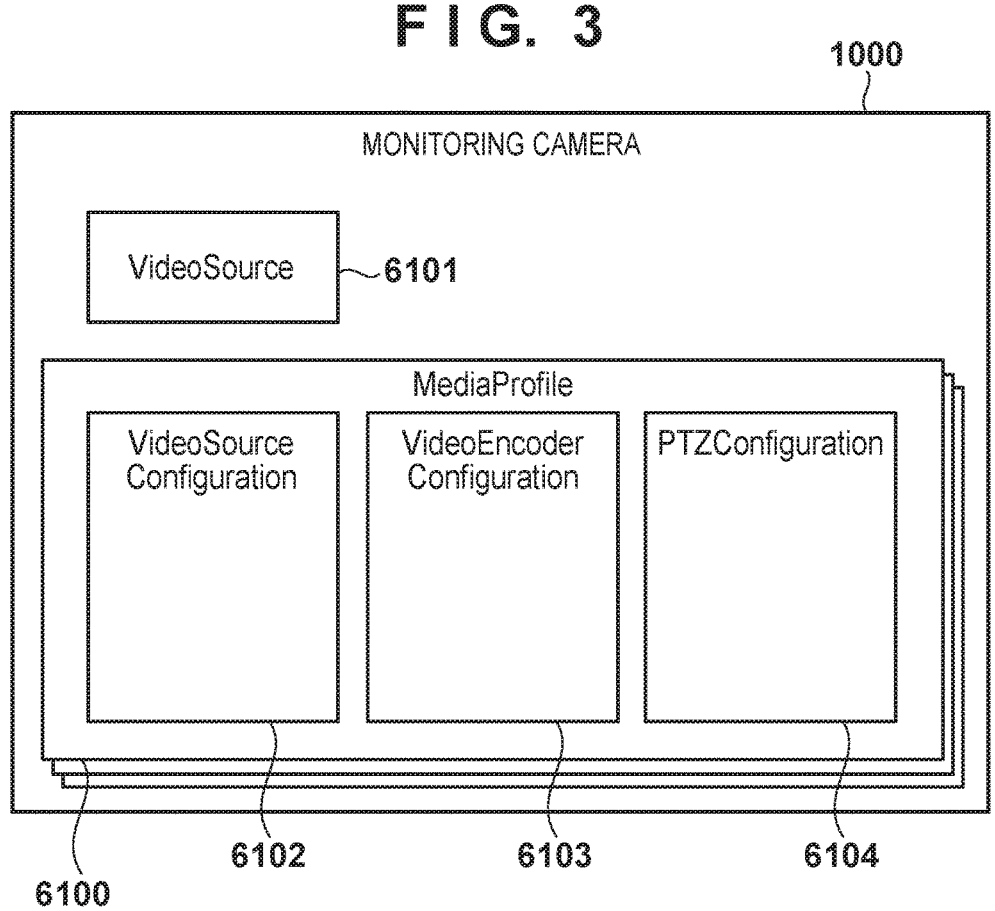
FIG. 3 is a view showing an example of the structure of parameters held by the image capturing apparatus.

Next, the names and contents of commands, parameters, and the like used in this embodiment will be explained. FIG. 3 shows the structure of parameters held by the monitoring camera 1000 (the image capturing apparatus) in this embodiment. A MediaProfile 6100 is a parameter set for storing various setting items of the monitoring camera by associating them with each other. The MediaProfile 6100 holds links to various setting items including a ProfileToken as the ID (identification information) of the MediaProfile 6100, a VideoSourceConfiguration 6102, a VideoEncoderConfiguration 6103, a PTZConfiguration 6104, and a voice encoder.

A VideoSource 6101 is a set of parameters indicating the performance of the image capturing unit 1003 of the monitoring camera. The VideoSource 6101 includes a VideoSourceToken as the ID of the VideoSource 6101, and Resolution indicating the resolution of image data which the image capturing unit 1003 can output. The VideoSource 6101 can switch to a plurality of other VideoSourceModes (operation modes) that support different Resolutions, in accordance with a SetVideoSourceMode command (to be described later).

The VideoSourceConfiguration 6102 is a set of parameters for associating the VideoSource 6101 of the monitoring camera 1000 with the MediaProfile 6100. The VideoSourceConfiguration 6102 includes Bounds that designate a portion to be cut out, as a distribution image, from image data output from the VideoSource 6101.

The VideoEncoderConfiguration 6103 is a set of parameters for associating the settings of an encoder (the compression encoding unit 1004) pertaining to image data compression encoding with the MediaProfile 6100. The compression encoding unit 1004 of the monitoring camera 1000 compression-encodes image data output based on the contents of the VideoSource 6101 and VideoSourceConfiguration 6102. The compression encoding unit 1004 of the monitoring camera 1000 compression-encodes image data output from the image capturing unit 1003, in accordance with a parameter such as the compression encoding scheme (for example, JPEG or H.264) set in VideoEncoderConfiguration 6103, the frame rate, or resolution. The monitoring camera 1000 distributes the compression-encoded image data to the client apparatus 2000 via the communication unit 1005.

The VideoEncoderConfiguration 6103 includes a VideoEncoderConfigurationToken as the ID (identification information) of the VideoEncoderConfiguration 6103. The VideoEncoderConfiguration 6103 also includes Encoding for designating a compression encoding scheme, a Resolution for designating the resolution of an output image, and a Quality for designating the compression encoding quality. Furthermore, the VideoEncoderConfiguration 6103 includes FramerateLimit for designating the maximum frame rate of an output image, and BitrateLimit for designating the maximum bit rate.

The PTZConfiguration 6104 is a set of parameters for associating the settings of the panning mechanism 1101, tilting mechanism 1102, and zooming mechanism 1103 of the monitoring camera 1000 with the MediaProfile 6100. The PTZConfiguration 6104 contains information pertaining to a coordinate system for expressing actual panning/tilting angle values and an actual zooming magnification value in the panning mechanism, tilting mechanism, and zooming mechanism.

A table shown in FIG. 4 contains information of a plurality of choices for matching the settings of the image capturing unit 1003 with those of the compression encoding unit 1004. This table shown in FIG. 4 indicates the setting contents of VideoSourceModes supported by the monitoring camera 1000, and the setting contents of the VideoEncoderConfigurations 6103 matching the VideoSourceModes. The table shown in FIG. 4 is prestored in the storage unit 1002 of the monitoring camera 1000, and referred to by the control unit 1001 any time. The table shown in FIG. 4 need not always be prestored in the storage unit 1002, and may also obtain necessary data by referring to a database of the external apparatus via the communication unit 1005.

A VideoSourceMode 4000 indicates the management number of a VideoSourceMode to be used in internal processing by the monitoring camera 1000. In this embodiment, the monitoring camera 1000 supports three VideoSourceModes S1, S2, and S3.

A Resolution 4001 is the parameter value of the Resolution of each VideoSourceMode (S1, S2, or S3), and indicates the resolution of image data generated by the image capturing unit 1003. A Framerate 4002 is the parameter value of the frame rate of each VideoSourceMode, and indicates the frame rate of image data to be generated by the image capturing unit 1003.

Items from Encoding 4003 to FramerateLimit 4006 are choices of the parameters of the VideoEncoderConfiguration 6103 which match when the VideoSource 6101 is each VideoSourceMode. The Encoding 4003 indicates a choice of a compression encoding scheme in the VideoEncoderConfiguration, which matches the VideoSourceMode. The Resolution Choice 4004 indicates the management number of the resolution of the compression-encoded output image in the VideoEncoderConfiguration, which is to be used in the internal processing of the monitoring camera 1000. In this embodiment, the monitoring camera 1000 supports four resolutions E1 to E4.

The Resolution 4005 is the parameter value of the resolution of the VideoEncoderConfiguration, which matches each VideoSourceMode. This set value determines the resolution of a distribution image to be output from the compression encoding unit 1004. The FramerateLimit 4006 (the frame rate limit) indicates the maximum value of the frame rate in the VideoEncoderConfiguration, which matches each VideoSourceMode.

Figure 5A:
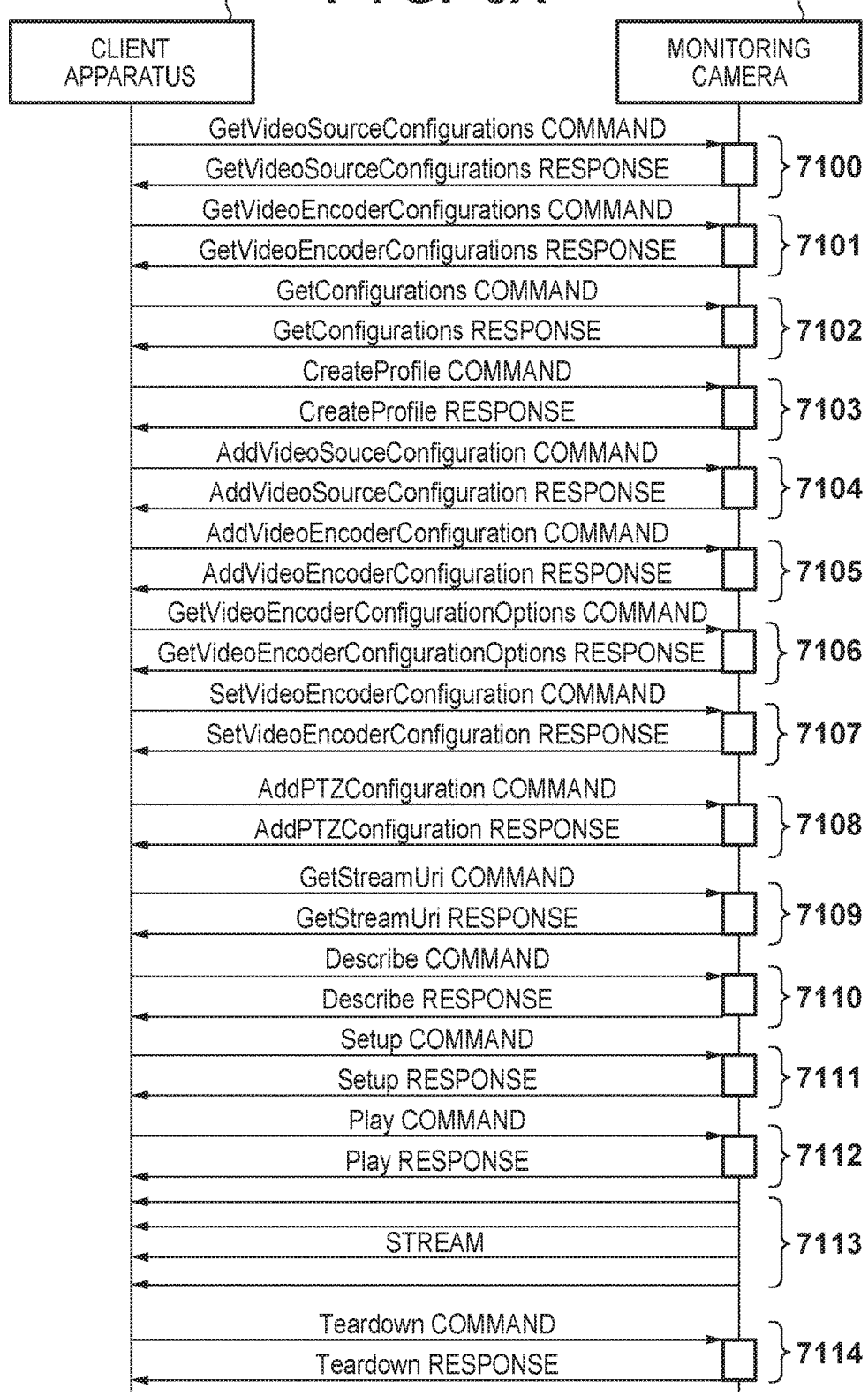
FIG. 5A is a view showing an example of a command sequence from the start of setting of the image capturing apparatus to video distribution.

FIG. 5A shows a command sequence from setting start to video distribution between the monitoring camera 1000 and client apparatus 2000. Transaction means a pair of a command to be transmitted from the client apparatus 2000 to the monitoring camera 1000, and a response to be returned from the monitoring camera 1000 to the client apparatus 2000.

A transaction 7100 is the transaction of a GetVideoSourceConfigurations command. By this command, the client apparatus 2000 obtains a list of the VideoSourceConfigurations 6102 held by the monitoring camera 1000.

A transaction 7101 is the transaction of a GetVideoEncoderConfigurations command. By this command, the client apparatus 2000 obtains a list of the VideoEncoderConfigurations 6103 held by the monitoring camera 1000.

A transaction 7102 is the transaction of a GetConfigurations command. By this command, the client apparatus 2000 obtains a list of the PTZConfigurations 6104 held by the monitoring camera 1000.

A transaction 7103 is the transaction of a CreateProfile command. By this command, the client apparatus 2000 causes the monitoring camera 1000 to form a new MediaProfile 6100, and obtains its Profiletoken.

A transaction 7104 is the transaction of an AddVideoSourceConfiguration command, and a transaction 7105 is the transaction of an AddVideoEncoderConfiguration command. A transaction 7108 is each transaction of an AddPTZConfiguration command. By designating the ID in these commands, the client apparatus 2000 can associate a desired VideoSourceConfiguration, desired VideoEncoderConfiguration, and desired PTZConfiguration with the designated MediaProfile.

A transaction 7106 is the transaction of a GetVideoEncoderConfigurationOptions command. By this command, the client apparatus 2000 obtains the choices or set value range of each parameter acceptable by the monitoring camera 1000, in the VideoEncoderConfiguration designated by the ID.

A transaction 7107 is the transaction of a SetVideoEncoderConfiguration command. By this command, the client apparatus 2000 sets each parameter of the VideoEncoderConfiguration 6103.

A transaction 7109 is the transaction of a GetStreamUri command. By this command, the client apparatus 2000 obtains an address (URI) with which the monitoring camera 1000 obtains a distribution stream based on the settings of the designated MediaProfile.

A transaction 7110 is the transaction of a Describe command. By executing this command by using the URI obtained in the transaction 7109, the client apparatus 2000 requests and obtains information of contents to be distributed by a stream by the monitoring camera 1000.

A transaction 7111 is the transaction of a Setup command. By executing this command by using the URI obtained in the transaction 7109, the client apparatus 2000 and monitoring camera 1000 share a stream transmission method including the session number.

A transaction 7112 is the transaction of a Play command. By executing this command by using the session number obtained in the transaction 7111, the client apparatus 2000 requests the monitoring camera 1000 to start streaming.

In a distribution stream 7113, the monitoring camera 1000 distributes a stream requested to be started in the transaction 7112 by the transmission method shared in the transaction 7111.

A transaction 7114 is the transaction of a Teardown command. By executing this command by using the session number obtained in the transaction 7111, the client apparatus 2000 requests the monitoring camera 1000 to stop the stream.

FIG. 5B shows a command sequence when the setting change of the image capturing unit 1003, which includes changing of the output resolution, is performed between the monitoring camera 1000 and client apparatus 2000.

A transaction 7200 is the transaction of a GetVideoSourceMode command. The GetVideoSourceMode command is a command for returning a list of VideoSourceModes supported by the VideoSource 6101 having the ID designated by the client apparatus 2000. When receiving the GetVideoSourceMode command, the control unit 1001 of the monitoring camera 1000 obtains the parameters of the VideoSourceModes S1 to S3 saved in the storage unit 1002 and shown in FIG. 4, and returns the parameters to the client apparatus 2000 via the communication unit 1005.

A transaction 7201 is the transaction of a SetVideoSourceMode command. The SetVideoSourceMode command is a command for designating changing of the VideoSourceMode of the VideoSource 6101 designated by the client apparatus 2000. Transactions 7109 to 7112 and a distribution stream 7113 are the same as those shown in FIG. 5A.

Figure 5C:
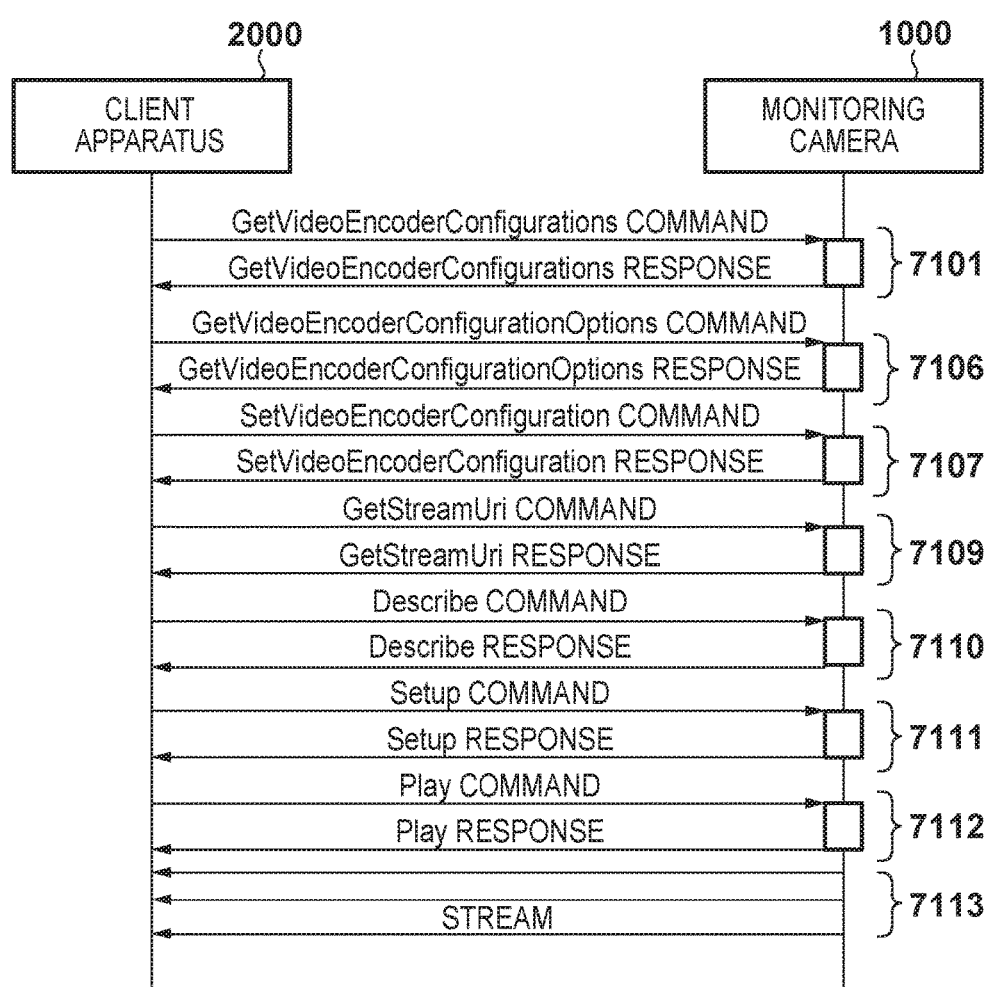
FIG. 5C is a view showing an example of a command sequence when changing the output resolution of the compression encoding unit of the image capturing apparatus.

FIG. 5C shows a typical command sequence when changing the output resolution of the compression encoding unit 1004 between the monitoring camera 1000 and client apparatus 2000.

Transactions 7101, 7106, 7107, and 7109 to 7113 are the same as those of the command sequence shown in FIG. 5A.

Figure 6A:
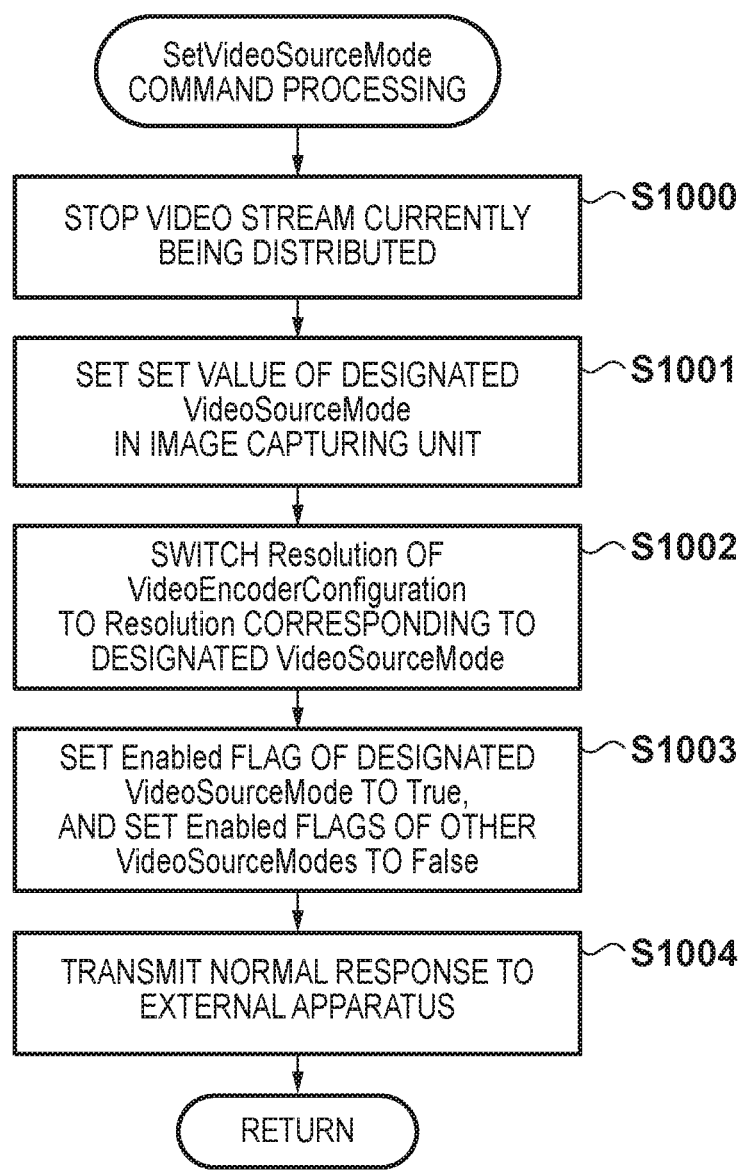
FIG. 6A is a view for explaining a procedure when the image capturing apparatus changes the settings of the image capturing unit.

FIG. 6A is a view showing processing when the monitoring camera 1000 has received the above-described SetVideoSourceMode command (transaction 7201) from the client apparatus 2000. In step S1000, the control unit 1001 stops a video stream currently being distributed via the communication unit 1005.

In step S1001, the control unit 1001 determines whether the input VideoSourceMode is S1, S2, or S3, obtains the set value of the corresponding VideoSourceMode, and sets the set value in the image capturing unit 1003.

In step S1002, the control unit 1001 determines whether the set value of the resolution (Resolution) of each VideoEncoderConfiguration stored in the storage unit 1002 is E1, E2, E3, or E4. The control unit 1001 sets, in the VideoEncoderConfiguration, the resolution matching the VideoSourceMode determined in step S1001 and having the same management number. That is, if the resolution of the VideoEncoderConfiguration is 1,920×1,080=E2 before command reception when the VideoSourceMode of the VideoSource 6101 is changed from S1 to S2, the resolution is changed to 2,048×1,536 as the resolution of E2 matching S2 by the reception of this command.

In step S1003, the control unit 1001 sets an Enable flag corresponding to the VideoSourceMode determined in step S1001 to "True", and sets enable flags corresponding to other VideoSourceModes to "False".

In step S1004, the control unit 1001 transmits a normal response to the client apparatus 2000.

Figure 6B:
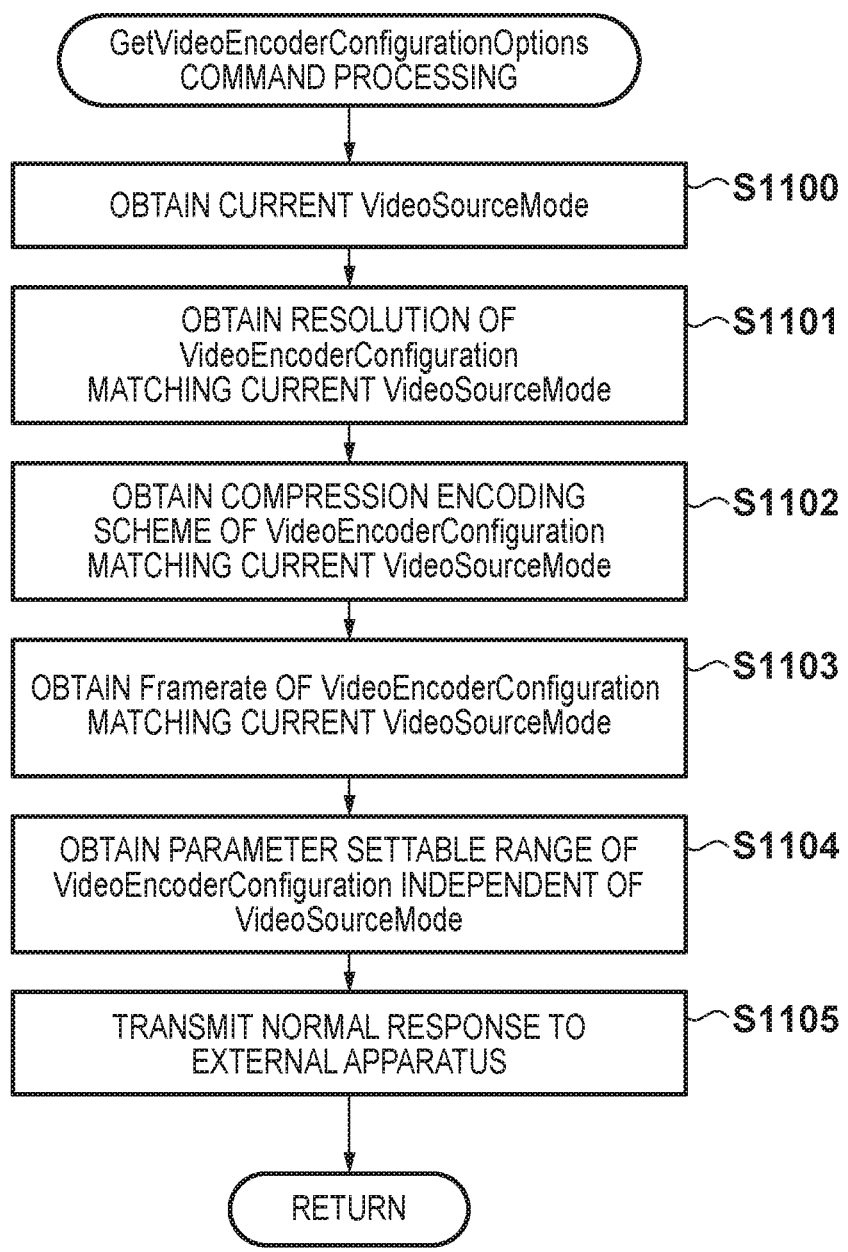
FIG. 6B is a view for explaining a procedure when the image capturing apparatus transmits a selectable set value to an information processing apparatus.

FIG. 6B shows processing when the monitoring camera 1000 has received a GetVideoEncoderConfigurationOption command (the transaction 7106) from the client apparatus 2000. In step S1100, the control unit 1001 obtains the set value of the VideoSourceMode currently set in the VideoSource 6101, and determines whether the set value is S1, S2, or S3.

In steps S1101, S1102, and S1103, the control unit 1001 refers to the table shown in FIG. 4 which is stored in the storage unit 1002, and obtains a selectable set value (choice) matching the current VideoSourceMode. The control unit 1001 obtains the choices E1 to E4 of the resolution of the VideoEncoderConfiguration, the choices of the Encoding, and the FramerateLimit as the maximum frame rate. For example, when the set value of the current VideoSourceMode is S3, the control unit 1001 obtains 800×600 (E1), 640×480 (E2), 320×240 (E3), and 176×144 (E4) as the choices of the Resolution. Also, the control unit 1001 obtains H.264 and MotionJPEG as the choices of the Encoding, and 30 fps as the FramerateLimit.

In step S1104, the control unit 1001 obtains the choices and setting range of the VideoEncoderConfiguration independent of the current VideoSourceMode from the storage unit 1002. For example, the control unit 1001 obtains 1 to 5 as the settable range of the Quality, and 60 Mbps as the set value of the BitrateLimit.

In step S1105, the control unit 1001 transmits a normal response containing the choices and setting ranges obtained in steps S1101 to S1104 to the client apparatus 2000 via the communication unit 1005.

Figure 6C:
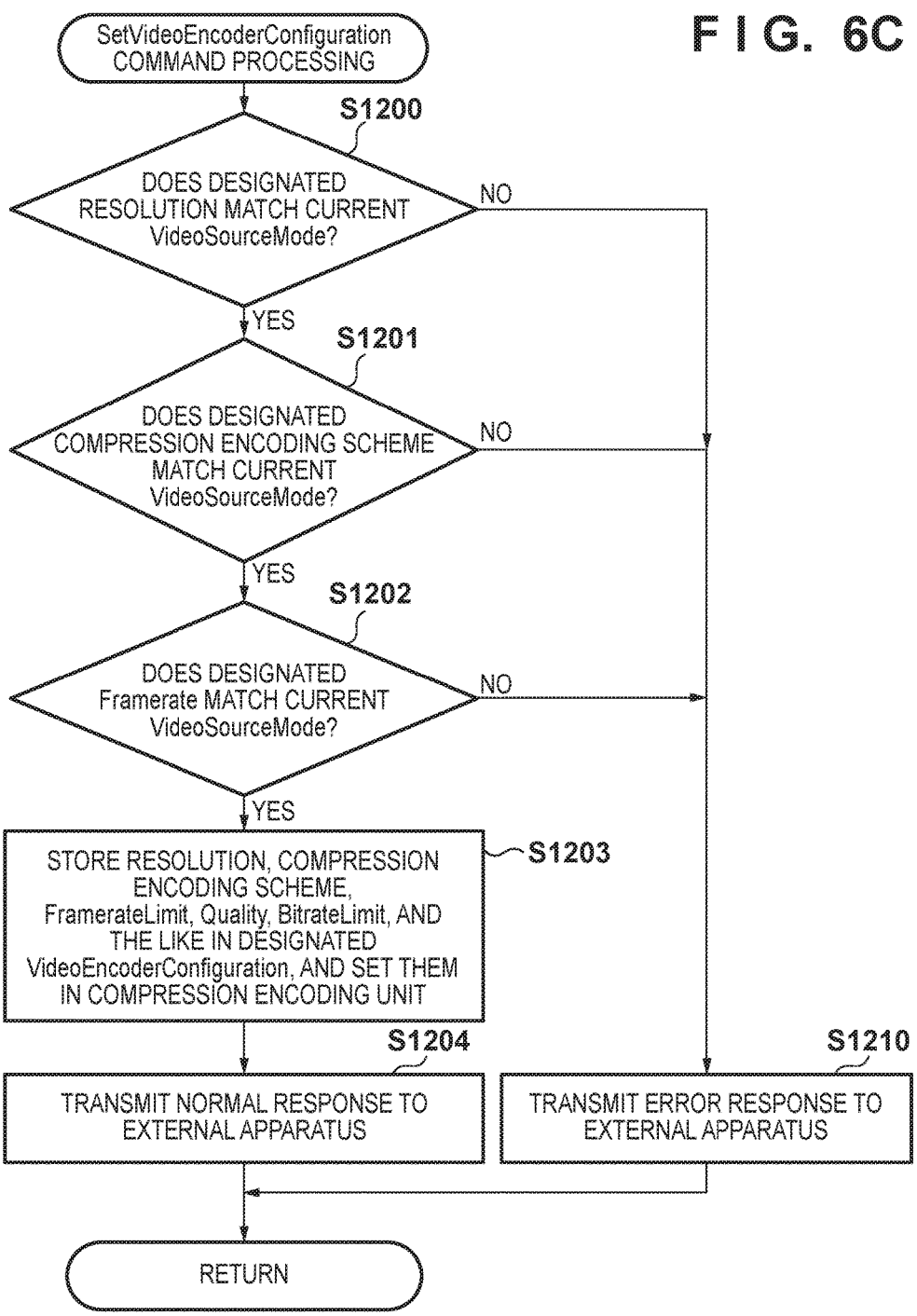
FIG. 6C is a view for explaining a procedure when the image capturing apparatus changes the settings of the compression encoding unit.

FIG. 6C shows processing when the monitoring camera 1000 has received the above-described SetVideoEncoderConfiguration command (transaction 7107) from the client apparatus 2000.

Insteps S1200, S1201, and S1202, the control unit 1001 determines whether the set value input to the received SetVideoEncoderConfiguration matches the current VideoSourceMode. The control unit 1001 refers to the table shown in FIG. 4 which is stored in the storage unit 1002, and determines whether the Resolution, Encoding, and FramerateLimit input to the received SetVideoEncoderConfiguration match the current VideoSourceMode. If even one parameter does not match, the control unit 1001 advances the process to step S1210. In step S1210, the control unit 1001 transmits an error response to the client apparatus 2000 via the communication unit 1005.

On the other hand, in step S1203, the control unit 1001 stores the set values of the VideoEncoderConfiguration including the Quality, BitrateLimit, Encoding, FramerateLimit, and Resolution in the storage unit 1002, and sets them in the compression encoding unit 1004.

In step S1204, the control unit 1001 transmits a normal response to the client apparatus 2000.

Figure 7A:
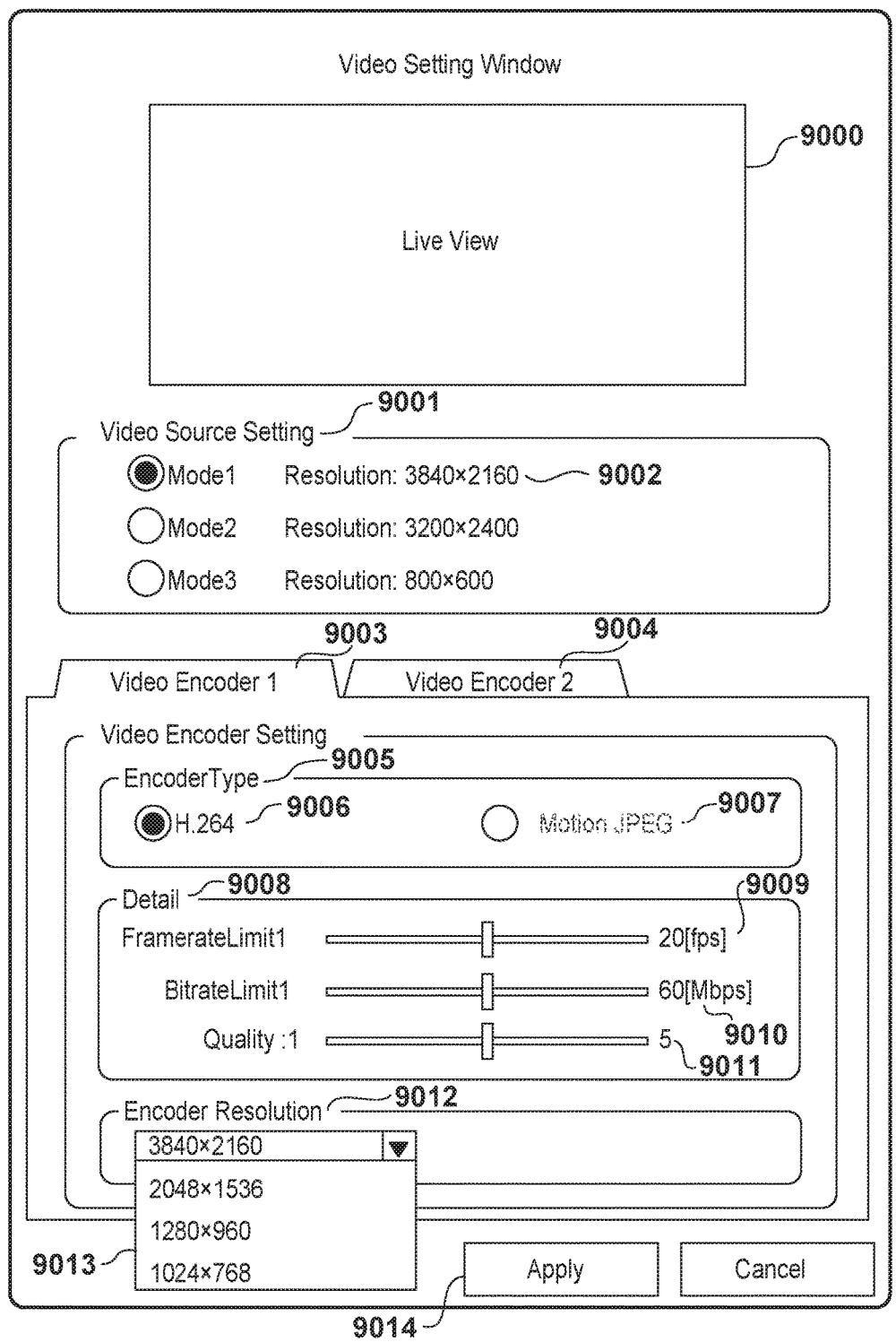
FIG. 7A is a view showing an example of a setting screen of a client apparatus.

FIG. 7A is a view showing an example of a setting screen of the client apparatus 2000, in which the VideoSourceMode and VideoEncoderConfiguration of the monitoring camera 1000 according to this embodiment are set.

When the setting screen shown in FIG. 7A is opened, the client apparatus 2000 executes the sequence shown in FIG. 5A, and displays a video stream obtained in the transaction 7113 in a LiveView area 9000 (a display area).

An area 9001 is a VideoSourceMode selection area. The client apparatus 2000 displays, in this area, a list of VideoSourceModes obtained by the transaction 7200 of the GetVideoSourceMode command executed when this setting screen is opened, so that the user can select a mode as indicated by reference numeral 9002. If a VideoSourceMode different from the current setting is selected in this area, the client apparatus 2000 executes the SetVideoSourceMode command, and changes the VideoSourceMode of the monitoring camera 1000. In this state, the client apparatus 2000 executes the transactions shown in FIG. 5B, and displays a video stream having the new settings in the LiveView area 9000 (the display area). In addition, the client apparatus 2000 executes the GetVideoEncoderConfigurationOptions command, and updates the choices and setting ranges of the individual parameters of the VideoEncoder in this screen by using the obtained results. Accordingly, the client apparatus 2000 can always provide the user with the choices and setting ranges of the set values of the VideoEncoderConfiguration matching the VideoSourceMode.

Setting screen switching sections 9003 and 9004 are tabs for switching VideoEncoder setting screens for allowing the user to change the set values of the VideoEncoderConfiguration 6103 of the monitoring camera 1000. The number of tabs is two (the setting screen switching sections 9003 and 9004) in this embodiment, but it is also possible to display tabs equal in number to the VideoEncoderConfigurations 6103 obtained by the GetVideoEncoderConfigurations command and supported by the monitoring camera 1000.

An area 9005 is an area for allowing the user to select the compression encoding scheme of each VideoEncoderConfiguration. The GetVideoEncoderConfigurationOptions command is executed when the setting screen is opened, or when a new VideoSourceMode is selected in the VideoSourceMode selection area. The area 9005 displays the choices of encoding obtained by the GetVideoEncoderConfigurationOptions command. A choice 9006 indicates currently selectable Encoding, and a choice 9007 indicates currently unselectable Encoding.

An area 9008 is a Detail area for allowing the user to select the FramerateLimit, BitrateLimit, and Quality included in the VideoEncoderConfiguration 6103. The GetVideoEncoderConfigurationOptions command is executed when the setting screen shown in FIG. 7A is opened, or when a new VideoSourceMode is selected in the VideoSourceMode selection area. The contents of the setting ranges obtained by the GetVideoEncoderConfigurationOptions command are reflected in setting ranges 9009, 9010, and 9011.

An area 9012 is an area for selecting the resolution of the VideoEncoderConfiguration 6103. The GetVideoEncoderConfigurationOptions command is executed when the setting screen shown in FIG. 7A is opened, or when a new VideoSourceMode is selected in the VideoSourceMode selection area. The contents of the choices of the Resolution parameter obtained by the GetVideoEncoderConfigurationOptions command are displayed in a dropdown list 9013.

When the user presses an apply button 9014, the client apparatus 2000 transmits the SetVideoEncoderConfiguration command to the monitoring camera 1000. The parameters selected in the areas 9005, 9008, and 9012 are reflected in the compression encoding unit 1004 of the monitoring camera 1000.

When the VideoSourceMode is changed by the client apparatus 2000, the monitoring camera 1000 can maintain the contents of choices provided by the setting contents of the VideoEncoderConfiguration and by the VideoEncoderConfigurationOptions command, as contents matching the VideoSourceMode. Accordingly, when obtaining a distribution image after changing the VideoSourceMode, the client apparatus 2000 need not change the setting contents of the VideoEncoderConfiguration to contents matching the VideoSourceMode. That is, even when the resolution of image data to be generated by the image capturing unit 1003 of the monitoring camera 1000 is changed, it is possible to prevent the occurrence of mismatching in various settings including the resolution of a distribution image to be generated by the compression encoding unit 1004. It is also possible to easily generate a distribution image after the resolution is changed.

Second Embodiment

In the first embodiment, the arrangement in which the contents of choices provided by the setting contents of the VideoEncoderConfiguration and by the VideoEncoderConfigurationOptions command are changed to contents matching the VideoSourceMode has been explained.

In this arrangement of the first embodiment, the types of the choices of the resolution of the compression encoding unit provided by the GetVideoEncoderConfigurationOptions command are not limited to those matching the VideoSourceMode. It is also possible to always provide all choices of the resolution to the client apparatus 2000 by the GetVideoEncoderConfigurationOptions command. In accordance with a new set value set in the compression encoding unit 1004 by the client apparatus 2000 by using the SetVideoEncoderConfiguration command, the monitoring camera 1000 may also internally switch the VideoSourceMode to a mode matching the new set value.

The second embodiment of the present invention taking this point into consideration will be explained below. Note that an explanation of the same portions as those of the first embodiment will be omitted.

Figure 6D:
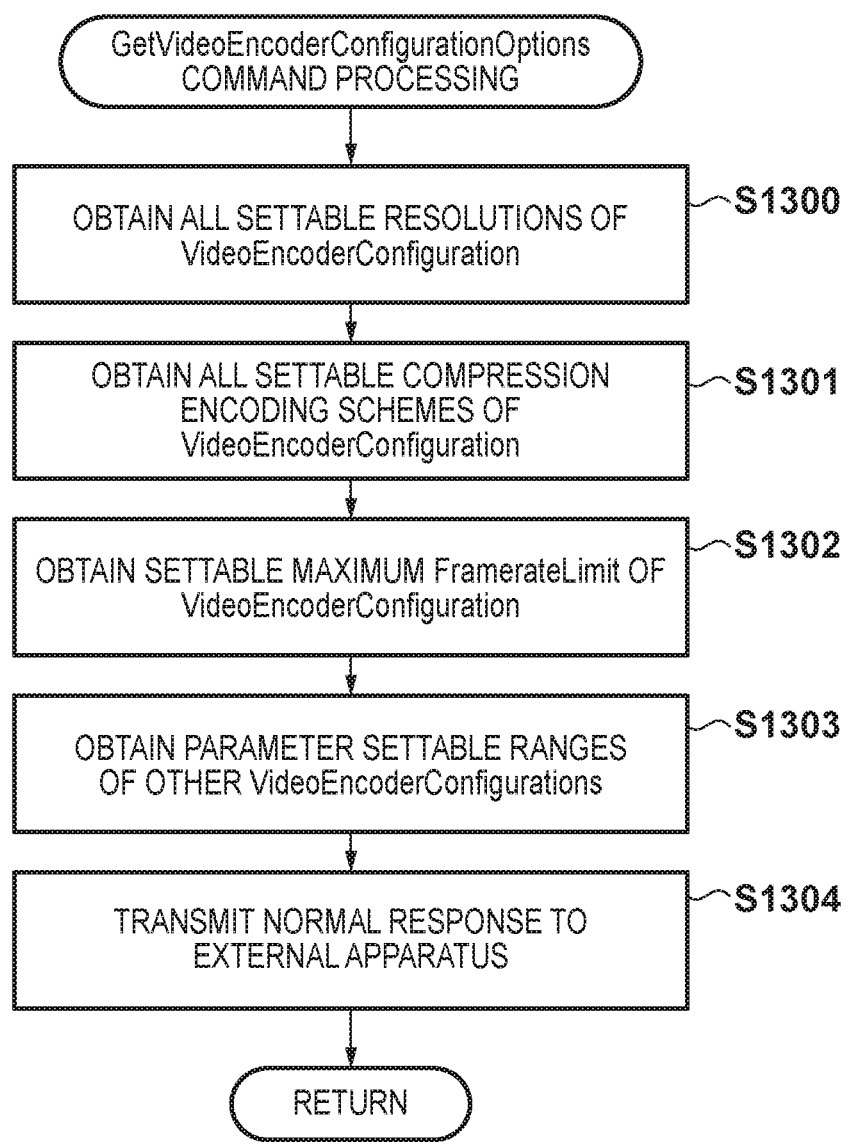
FIG. 6D is a view for explaining a procedure when the image capturing apparatus transmits a selectable set value to the information processing apparatus.

FIG. 6D is a view showing processing when a monitoring camera 1000 has received the GetVideoSourceConfigurationOptions command from a client apparatus 2000.

In step S1300, a control unit 1001 refers to the table shown in FIG. 4 which is stored in a storage unit 1002, and obtains all possible choices of the resolution of the VideoEncoderConfiguration. That is, the control unit 1001 obtains E1 to E4 in S1, E1 to E4 in S2, and E1 to E4 in S3 as choices.

In step S1301, the control unit 1001 refers to the table shown FIG. 4 which is stored in the storage unit 1002, and obtains all possible choices of the compression encoding scheme of the VideoEncoderConfiguration. That is, the control unit 1001 obtains MotionJPEG and H.264 as choices.

In step S1302, the control unit 1001 refers to the table shown in FIG. 4 which is stored in the storage unit 1002, and obtains the maximum one of possible values of the FramerateLimit of the VideoEncoderConfiguration. That is, the control unit 1001 obtains 30 fps as the maximum value of the FramerateLimit.

In step S1303, the control unit 1001 obtains the choices and setting range of the VideoEncoderConfiguration independent of the current VideoSourceMode from the storage unit 1002. For example, the control unit 1001 obtains 1 to 5 as the settable range of the Quality, and 60 Mbps as the set value of the BitrateLimit.

In step S1304, the control unit 1001 transmits a normal response containing the choices and setting range obtained in steps S1300 to S1303 to the client apparatus 2000 via a communication unit 1005.

Figure 6E:
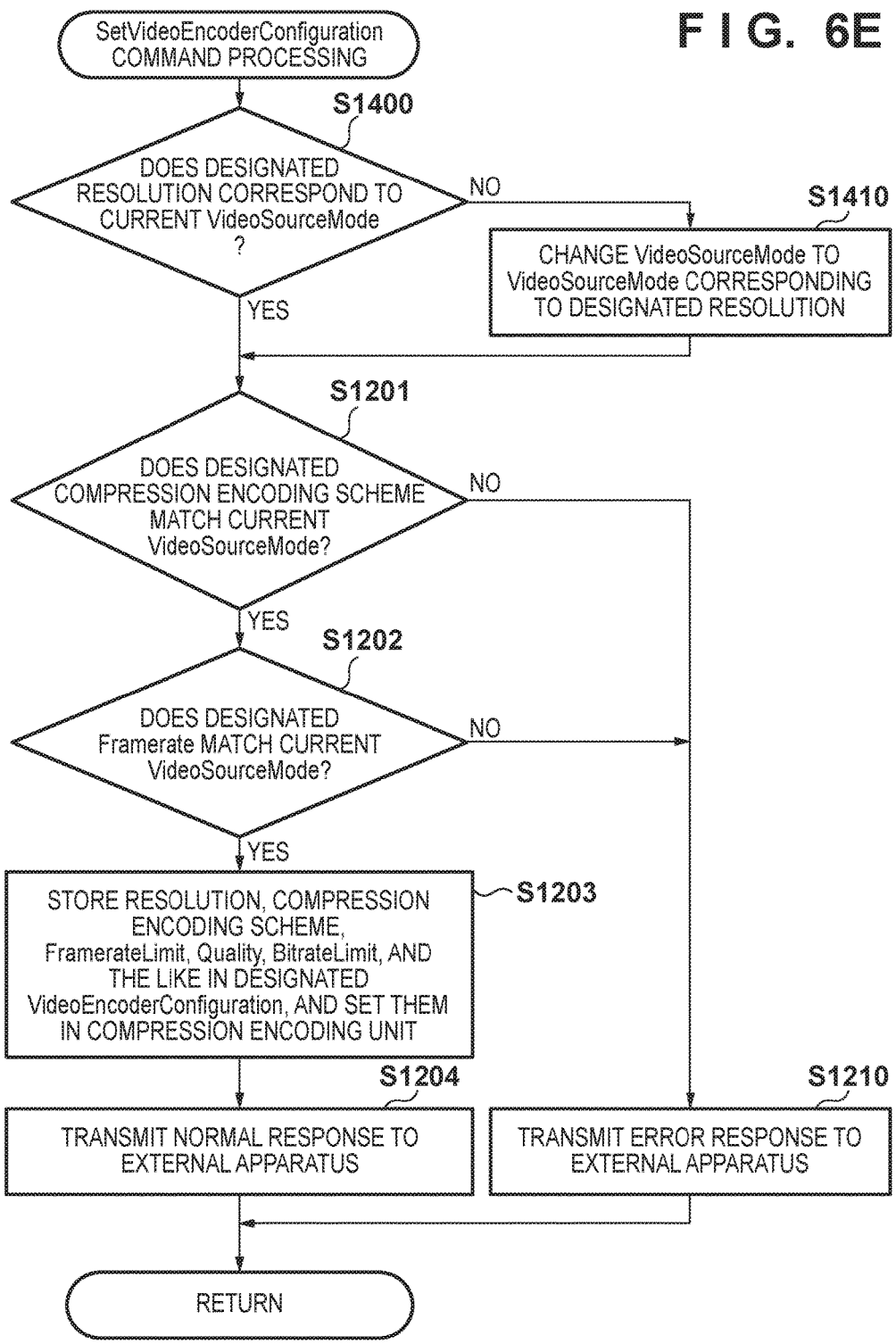
FIG. 6E is a view for explaining a procedure when the image capturing apparatus changes the settings of the compression encoding unit.

FIG. 6E is a view showing processing when the monitoring camera 1000 has received the above-described SetVideoEncoderConfiguration command from the client apparatus 2000.

In step S1400, the control unit 1001 refers to the table shown in FIG. 4 which is stored in the storage unit 1002, and determines whether the resolution set in the received SetVideoEncoderConfiguration command matches the current VideoSourceMode. If the resolution matches the mode (Yes in step S1400), the control unit 1001 advances the process to step S1201. If the resolution does not match the mode (No in step S1400), the control unit 1001 advances the process to step S1410.

In step S1410, the control unit 1001 refers to the table shown in FIG. 4 which is stored in the storage unit 1002, and switches the current VideoSourceMode to a VideoSourceMode having a matched input resolution. For example, when 640×480 is input as a Resolution to this command while the VideoSourceMode is S1, the VideoSourceMode is switched to S3 matching this resolution. When the resolution is changed to a resolution different from the setting of an image capturing unit (the resolution of the VideoSourceMode) by the command for setting the resolution of the encoding unit (the resolution of a distribution image), the control unit 1001 changes the setting of the resolution of the image capturing unit to a resolution matching the resolution of the encoding unit. Processes in steps S1201 to S1204 and S1210 are the same as those shown in FIG. 6C.

Figure 7B:
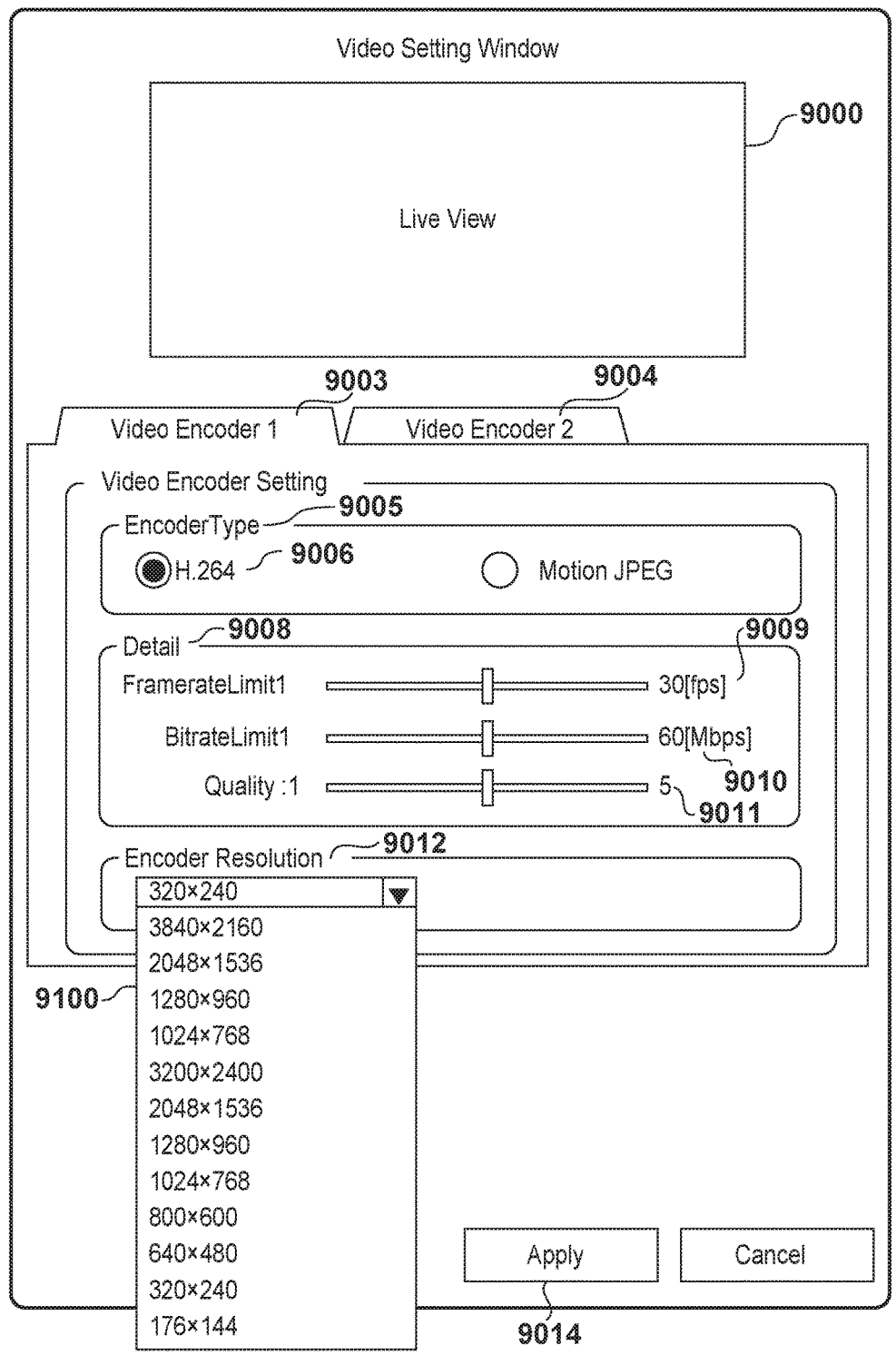
FIG. 7B is a view showing another example of the setting screen of the client apparatus.

FIG. 7B is a view showing an example of a setting screen of the client apparatus 2000 in which the VideoSourceMode and VideoEncoderConfiguration of the monitoring camera 1000 according to this embodiment are set.

An area 9012 is an area for selecting the resolution of a VideoEncoderConfiguration 6103. The GetVideoEncoderConfigurationOptions command is executed when the setting screen shown in FIG. 7B is opened. A dropdown list 9100 displays the contents of the choices of a Resolution parameter obtained by the GetVideoEncoderConfigurationOptions command. As shown in FIG. 6D, the monitoring camera 1000 according to this embodiment provides all resolutions obtained from the table shown in FIG. 4 as choices. Therefore, the dropdown list 9100 displays all the resolutions.

The monitoring camera 1000 provides the client apparatus 2000 with all possible setting contents of the VideoEncoderConfiguration as choices, regardless of the VideoSourceMode. If a parameter of the VideoEncoderConfiguration not matching the current VideoSourceMode, which includes the resolution of a compression encoding unit 1004, is designated, it is possible to internally switch to a matching VideoSourceMode. Accordingly, when obtaining a distribution image after the parameter of the VideoEncoderConfiguration is changed, the client apparatus 2000 need not change the setting contents of the VideoSourceMode to contents matching the VideoEncoderConfiguration. That is, even when various settings including the resolution of a distribution image to be generated by the compression encoding unit 1004 are changed, it is possible to prevent the occurrence of mismatching in the resolution of image data to be generated by an image capturing unit 1003. It is also possible to facilitate generating a distribution image after the resolution is changed.

The operations of the monitoring camera, application program, and client apparatus according to the present invention have been disclosed in the first and second embodiments. However, the spirit and scope of the invention are not limited to the above-described embodiments, and partially changeable.

For example, in step S1002 of FIG. 6A, the set values of the Resolutions of the VideoEncoderConfigurations are uniformly changed to a resolution having the same management number matching the VideoSourceMode. However, the spirit and scope of the present invention are not limited to this. For example, of the Resolutions of the VideoEncoderConfigurations, a Resolution that keeps matching before and after the VideoSourceMode is changed can also be kept used after the VideoSourceMode is changed.

Also, all possible choices of the resolution of the VideoEncoderConfiguration are provided in step S1300 of FIG. 6D, but the spirit and scope of the present invention are not limited to this. For example, it is also possible to provide only a resolution matching the current VideoSourceMode as a choice, only when a video stream having a given resolution has already been distributed from the monitoring camera 1000.

Furthermore, all possible compression encoding schemes of the VideoEncoderConfiguration are obtained as choices in step S1301 of FIG. 6D, but the present invention is not limited to this. It is also possible to obtain only choices of compression encoding schemes matching all VideoSourceModes. This makes it possible to reduce the choice providing range, and prevent the SetVideoEncoderConfiguration command from designating compression encoding that does not match the VideoSourceMode selected at that point of time in step S1201.

In addition, the maximum one of all possible values of the FramerateLimit of the VideoEncoderConfiguration is obtained in step S1302 of FIG. 6D, but the present invention is not limited to this. For example, it is also possible to obtain the maximum FramerateLimit matching all VideoSourceModes. This makes it possible to reduce the choice providing range, and prevent the SetVideoEncoderConfiguration command from designating a FramerateLimit that does not match the VideoSourceMode selected at that point of time in step S1201.

Also, in step S1410 of FIG. 6E, VideoSourceModes are selectively switched based on the setting of the resolution of the SetVideoEncoderConfiguration command. However, the spirit and scope of the present invention are not limited to this. That is, a plurality of matching VideoSourceModes may exist. Accordingly, it is also possible to select the most matching VideoSourceMode based not only on the resolution but also on a plurality of other settings of the compression encoding unit, such as the compression encoding scheme and FramerateLimit.

In the present invention as described above, even when only one of the resolution of image data to be generated by the image capturing unit and the resolution of a distribution image to be generated by the compression encoding unit is changed, it is possible to prevent the occurrence of mismatching in a combination of these resolutions.

Other Embodiments

Embodiments of the present invention can also be realized by a computer of a system or apparatus that reads out and executes computer executable instructions recorded on a storage medium (for example, non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image capturing apparatus comprising:
a computer executing instructions that, when executed by the computer, cause the computer to function as:
a receiving control unit configured to control a receiving unit which receives, from an external apparatus, a command designating a parameter value related to image data; and
a transmitting control unit configured to control a transmitting unit which transmits a response to the external apparatus in response to the command received by the receiving unit,
wherein a video source mode is settable to the image capturing apparatus,
wherein the video source mode defines at least a maximum value for a parameter of a first kind and a maximum value for a parameter of a second kind,
wherein, an error response is not transmitted to the external apparatus from the transmitting unit in a state where a first video source mode is being set to the image capturing apparatus, if the parameter value designated by the command is not settable in the state and the parameter value designated by the command is the parameter value for the parameter of the first kind, and
wherein the transmitting control unit is configured to cause the transmitting unit to transmit an error response to the external apparatus in response to the command received by the receiving unit in the state, if the parameter value designated by the command is not settable in the state and the parameter value designated by the command is the parameter value for the parameter of the second kind.

2. The image capturing apparatus according to claim 1, wherein the video source mode is related to a video source configuration and a video encoder configuration.

3. The image capturing apparatus according to claim 1, wherein the video source mode includes information defining a plurality of parameters including resolution.

4. The image capturing apparatus according to claim 3, wherein the transmitting control unit is configured not to cause the transmitting unit to transmit the error response to the external apparatus, if the receiving unit receives a command related to a predetermined parameter among the plurality of parameters from the external apparatus.

5. The image capturing apparatus according to claim 3, wherein the plurality of parameters further include at least one of a frame rate and an encoding method.

6. The image capturing apparatus according to claim 1, further comprising a control unit configured to change a setting of the image capturing apparatus from the first video source mode to a second video source mode in which the parameter value designated by the command is settable, if the parameter value designated by the command is not settable in the state and the parameter value designated by the command is the parameter value for the parameter of the first kind.

7. The image capturing apparatus according to claim 6, wherein a setting of the image capturing apparatus is not changed from the first video source mode to the second video source mode, if the parameter value designated by the command is not settable in the state and the parameter value designated by the command is the parameter value for the parameter of the second kind.

8. The image capturing apparatus according to claim 1, wherein the parameter of the first kind is a parameter of resolution.

9. The image capturing apparatus according to claim 8, wherein the resolution is a number of pixels.

10. The image capturing apparatus according to claim 8, wherein the resolution is indicated by a number of pixels in width and a number of pixels in height.

11. The image capturing apparatus according to claim 1, wherein the parameter of the first kind is a parameter of a frame rate.

12. The image capturing apparatus according to claim 1, wherein the parameter of the second kind is a parameter of a frame rate.

13. The image capturing apparatus according to claim 1, wherein the parameter of the second kind is a parameter of an encoding method.

14. The image capturing apparatus according to claim 1, further comprising a determination unit configured to determine, based on the video source mode being set to the image capturing apparatus, whether the parameter value designated by the command is settable to the image capturing apparatus.

15. The image capturing apparatus according to claim 1, wherein the parameter value designated by the command is a parameter value of a video encoder configuration.

16. The image capturing apparatus according to claim 1, the instructions that, when executed by the computer, cause the computer to further function as an image data generating unit configured to generate image data in accordance with a parameter value based on the command received by the receiving unit, and
wherein the transmitting control unit is configured to cause the transmitting unit to transmit the image data generated by the image data generating unit.

17. The image capturing apparatus according to claim 16, wherein the transmitting control unit is configured to cause the transmitting unit to transmit the image data to the external apparatus via a network.

18. The image capturing apparatus according to claim 17, wherein the image data generating unit includes a generation unit configured to generate image data based on a video source configuration.

19. The image capturing apparatus according to claim 17, wherein the image data generating unit includes an encoding unit configured to encode image data based on a video encoder configuration, and
wherein the transmitting control unit is configured to cause the transmitting unit to transmit encoded image data.

20. The image capturing apparatus according to claim 16, wherein the image data generating unit is capable of generating image data by using H.264, in the state where the first video source mode is being set to the image capturing apparatus.

21. The image capturing apparatus according to claim 16, wherein the image data generating unit is capable of generating image data by using Motion JPEG, in the state where the first video source mode is being set to the image capturing apparatus.

22. The image capturing apparatus according to claim 16, wherein the image data generating unit is capable of generating image data in which resolution is greater than or equal to 960×540 pixels, in the state where the first video source mode is being set to the image capturing apparatus.

23. The image capturing apparatus according to claim 16, wherein the image data generating unit is capable of generating image data in which resolution is greater than or equal to 176×144 pixels, in the state where the first video source mode is being set to the image capturing apparatus.

24. The image capturing apparatus according to claim 16, wherein the image data generating unit is capable of generating image data in which a frame rate is 20 fps, in the state where the first video source mode is being set to the image capturing apparatus.

25. The image capturing apparatus according to claim 16, wherein the image data generating unit is capable of generating image data in which a frame rate is 30 fps, in the state where the first video source mode is being set to the image capturing apparatus.

26. The image capturing apparatus according to claim 16, wherein the image data generating unit is capable of generating image data in which resolution is greater than or equal to 960×540 pixels by using H.264, in the state where the first video source mode is being set to the image capturing apparatus.

27. The image capturing apparatus according to claim 16, wherein the image data generating unit is capable of generating image data in which resolution is greater than or equal to 960×540 pixels and a frame rate is 20 fps by using H.264, in the state where the first video source mode is being set to the image capturing apparatus.

28. The image capturing apparatus according to claim 16, wherein the image data generating unit is capable of generating image data in which resolution is greater than or equal to 960×540 pixels and a frame rate is 30 fps by using H.264, in the state where the first video source mode is being set to the image capturing apparatus.

29. A method for an image capturing apparatus which comprises a computer executing instructions that, when executed by the computer, cause the computer to perform the method, the method comprising:
a receiving step of receiving, from an external apparatus, a command designating a parameter value related to image data; and
a transmitting step of transmitting a response to the external apparatus in response to the command received in the receiving step,
wherein a video source mode is settable to the image capturing apparatus,
wherein the video source mode defines at least a maximum value for a parameter of a first kind and a maximum value for a parameter of a second kind, wherein, an error response is not transmitted to the external apparatus in the transmitting step in a state where a first video source mode is being set to the image capturing apparatus, if the parameter value designated by the command is not settable in the state and the parameter value designated by the command is the parameter value for the parameter value of the first kind, and wherein, in the transmitting step, an error response is transmitted to the external apparatus in response to the command received in the receiving step in the state, if the parameter value designated by the command is not settable in the state and the parameter value designated by the command is the parameter value for the parameter for the second kind.

30. An image capturing system comprising:

an image capturing apparatus configured to transmit image data to an image receiving apparatus, wherein the image receiving apparatus is configured to receive the image data from the image capturing apparatus, wherein the image capturing apparatus comprises a computer executing instructions that, when executed by the computer, cause the computer to function as:

a receiving control unit configured to control a receiving unit which receives a command designating a parameter value related to the image data;

an image data generating unit configured to generate the image data in accordance with a parameter value based on the command received by the receiving unit; and a transmitting control unit configured to control a transmitting unit which transmits the image data generated by the image data generating unit, wherein, a video source mode is settable to the image capturing apparatus, wherein, the video source mode defines at least a maximum value for a parameter of a first kind and a maximum value for a parameter of a second kind, wherein, an error response is not transmitted from the transmitting unit in a state where a first video source mode is being set to the image capturing apparatus, if the parameter value designated by the command is not settable in the state and the parameter value designated by the command is the parameter value for the parameter of the first kind, wherein, the transmitting control unit is configured to cause the transmitting unit to transmit an error response in response to the command received by the receiving unit in the state, if the parameter value designated by the command is not settable in the state and the parameter value designated by the command is the parameter value for the parameter of the second kind, wherein the image receiving apparatus comprises a computer executing instructions that, when executed by the computer, cause the computer to function as:

a display control unit configured to display a setting screen to a display unit, the setting screen being for designating the parameter value for the parameter of the first kind and the parameter value for the parameter of the second kind; and a transmitting control unit configured to control a transmitting which transmits a command designating a parameter value designated on the setting screen to the image capturing apparatus.

31. The image capturing system according to claim 30, wherein the receiving control unit to cause the receiving unit of the image capturing apparatus to receive the command designating the parameter value from the image receiving apparatus, and wherein, the transmitting control unit to cause the transmitting unit of the image capturing apparatus to transmit the error response to the image receiving apparatus in response to the command received by the receiving unit.

32. The image capturing system according to claim 30, wherein a parameter value for a parameter of at least one kind is capable of being designated from a drop down list displayed on the setting screen.

33. The image capturing system according to claim 30, wherein the parameter value for the parameter of the first kind and the parameter value for the parameter of the second kind are capable of being designated on the same setting screen displayed by display control unit.

34. The image capturing system according to claim 30, wherein the parameter of the first kind is a parameter of resolution.

35. The image capturing system according to claim 30, wherein the parameter of the second kind is at least one of a parameter of an encoding method and a parameter of a frame rate.

36. The image capturing system according to claim 30, wherein the parameter of the first kind is a parameter of a frame rate.

37. The image capturing system according to claim 30, wherein the parameter value designated by the command is a parameter value of a video encoder configuration.

38. A method for an image capturing system, wherein the image capturing system comprises an image capturing apparatus configured to transmit image data to an image receiving apparatus, wherein the image receiving apparatus is configured to receive the image data from the image capturing apparatus, wherein the method for the image capturing system comprises:

a method for the image capturing apparatus which comprises a computer executing instructions that, when executed by the computer, cause the computer to perform the method for the image capturing apparatus, the method for the image capturing apparatus comprising:

a receiving step of receiving a command designating a parameter value related to the image data;

an image data generating step of generating the image data in accordance with a parameter value based on the command received in the receiving step; and a transmitting step of transmitting the image data generated in the image data generating step, wherein, a video source mode is settable to the image capturing apparatus, wherein, the video source mode defines at least a maximum value for a parameter of a first kind and a maximum value for a parameter of a second kind, wherein, an error response is not transmitted in the transmitting step in a state where a first video source mode is being set to the image capturing apparatus, if the parameter value designated by the command is not settable in the state and the parameter value designated by the command is the parameter value for the parameter of the first kind, wherein, in the transmitting step, an error response is transmitted in response to the command received in the receiving step in the state, if the parameter value designated by the command is not settable in the state and the parameter value designated by the command is the parameter value for the parameter of the second kind, and a method for the image receiving apparatus which comprises a computer executing instructions that, when executed by the computer, cause the computer to perform the method for the image receiving apparatus, the method for the image receiving apparatus comprising:
a display control step of displaying a setting screen to a display unit, the setting screen being for designating the parameter value for the parameter of the first kind and the parameter value for the parameter of the second kind; and
a transmitting step of transmitting a command designating a parameter value designated on the setting screen to the image capturing apparatus.

* * * * *